United States Patent [19]
Nishida

[11] 3,716,788
[45] Feb. 13, 1973

[54] TACHOMETER GENERATOR

[75] Inventor: Koji Nishida, Kariya, Japan

[73] Assignee: Aisin Seiki Kabushiki Kaisha, Kariya-shi, Aichi-ken, Japan

[22] Filed: Dec. 22, 1970

[21] Appl. No.: 100,625

[30] Foreign Application Priority Data

Dec. 23, 1969   Japan..............................44/122541

[52] U.S. Cl. ..................324/174, 310/155, 310/168
[51] Int. Cl. ...............................................G01p 3/48
[58] Field of Search..............324/161, 162, 173, 174; 310/155, 168, 90

[56] References Cited

UNITED STATES PATENTS

| | | | |
|---|---|---|---|
| 2,798,976 | 7/1957 | Eckel | 310/155 |
| 2,651,734 | 9/1953 | Field | 324/174 |
| 3,500,091 | 3/1970 | Jones | 310/90 |

*Primary Examiner*—Michael J. Lynch
*Attorney*—Holman & Stern

[57] ABSTRACT

A tachometer generator has a toothed stator and a toothed rotor which may be formed in one piece with the revolvable inner race of a bearing supporting a shaft whose revolving speed is to be measured, the toothed stator is fixed to the stationary outer race of the same bearing, in such a manner that the toothed surfaces of the rotor and the stator are opposed to each other with a small airgap therebetween. The bearing outer race also supports magnetic means having a coil disposed in a magnetic path formed by the aforesaid bearing and the rotor and stator of the tachometer generator, so that, as the crests and roots of the stator teeth alternately face the crests and roots of the rotor teeth in revolution, a voltage which varies with the corresponding fluctuations in the amount of magnetic flux along the path is electromagnetically induced in the coil.

4 Claims, 3 Drawing Figures 3,716,788

TACHOMETER GENERATOR

BACKGROUND OF THE INVENTION

1. Field of the Invention

This invention relates generally to tachometry and in particular to a novel AC tacho generator to be built in association with a bearing for measurement of the rotational speed of a rotating shaft supported by the bearing from the frequency of an alternating current signal generated as the shaft revolves.

The tachometer generator of the invention is designed for optimum application in detection of monitoring the rotational speed of motor vehicle wheels, though not limited thereto, so that throughout the present specification it will be described only with relation to said application for the sake of simplicity and convenience of description.

2. Description of Prior Art

Prior art tachometer generators of comparable design, i.e., those consisting essentially of a rotor and a stator as still to be described in detail, must be installed in as close alignment as possible with a shaft or axle under observation in order to increase the signal-to-noise ratio of the generators. Used for measurement of the rotational speeds of the motor vehicle wheels driven with complex mechanisms, however, the prior art tacho generators are liable to suffer rotor axial wobble which tends to overload them and hence considerably shorten their service life. Attempts have been made to circumvent this defect by the provision of a maximum workable spacing between the aforesaid rotor and stator of the generators, only with the adverse result that undesired fluctuations are caused in their output due to the still unavoidable rotor axial wobble and to the resultant variations of the extended spacing therebetween. Further the output itself of such prior art generators is hardly of sufficient magnitude for correct or precise measurement of wheel speed.

SUMMARY OF THE INVENTION

It is accordingly a primary object of the present invention to provide a better tachometer generator which has a novel construction and altogether free from the above described drawbacks attendant to the prior art constructions.

Another object of the invention is to provide a tachometer generator to be built in a bearing supporting a shaft or axle whose rotational speed is to be measured.

Still another object of the invention is to provide a tachometer generator consisting primarily of a toothed rotor and a toothed stator which are formed more or less integrally with the inner race and outer race, respectively, of a bearing supporting a shaft or axle whose rotational speed is to be measured.

A further object of the invention is to provide a tachometer generator so made that the toothed surfaces of its rotor and stator are opposed to each other with an unvarying spacing therebetween.

With these objects in view and the other objects hereinafter set forth, the invention will now be described in detail with reference to the accompanying drawings in which is illustrated, by way of example only, a preferred form of the tachometer generator of the invention and in which like reference characters indicate like parts throughout the several Figures.

DETAILED DESCRIPTION OF THE INVENTION

Figure 1:
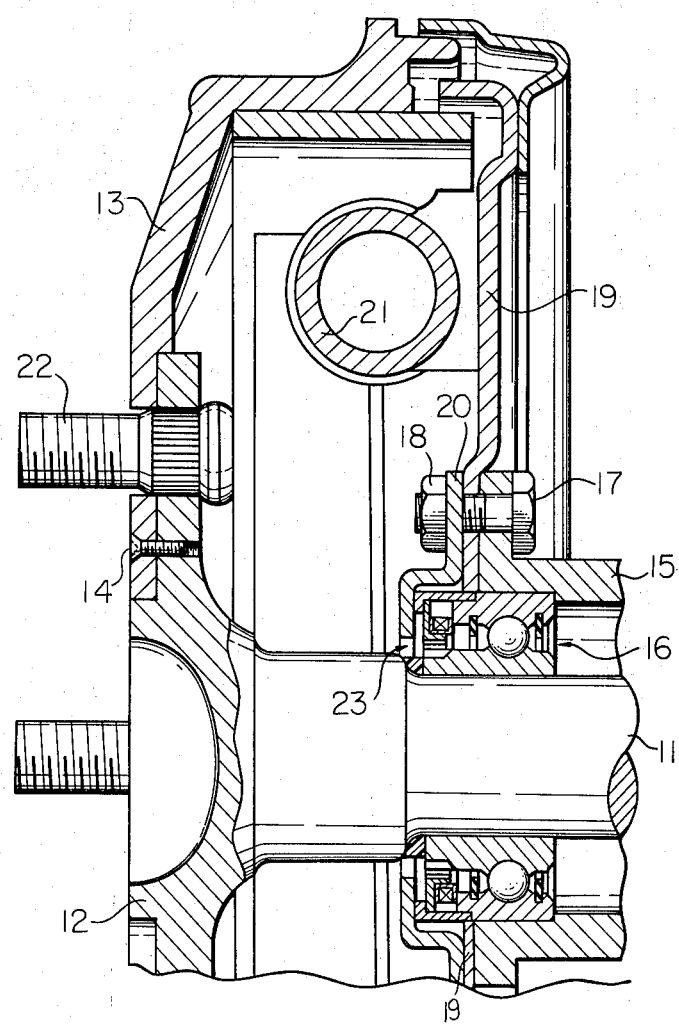
FIG. 1 is a fragmentary, vertical sectional view of a motor vehicle wheel, in which is shown a tachometer generator in its as-installed state in accordance with the present invention.

The tachometer generator of the present invention will now be described specifically in its preferred form. Referring first to FIG. 1, reference numeral 11 indicates an axle for driving the motor vehicle rear wheels. This axle 11 has a hub 12 to which is secured a brake drum 13 by means of screws 14 or the like. An axle housing 15 supports the axle 11 through a bearing 16 and supports also a backing plate 19 and a gasket 20 fixed thereto by means of bolts 17 and nuts 18. A wheel cylinder 21 is secured to the backing plate 19. Hub bolts 22 secured to the hub 12 and extending outwardly therefrom are for securing a motor vehicle tired wheel (not shown).

The bearing 16 comprises an outer race 25, an inner race 24, balls 32 interposed rollably between the outer and inner races, and seals 33 and 34 secured to the inner wall of the outer race on opposite sides of the balls.

Figure 2:
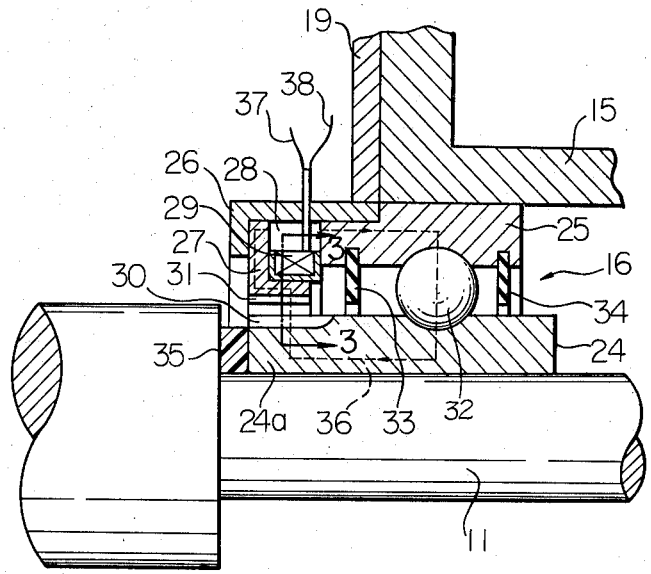
FIG. 2 is an enlarged, fragmentary, vertical sectional view of the tachometer generator of FIG. 1 together with its surrounding associated parts.

The reference numeral 23 generally designates a tachometer generator in accordance with the present invention, used here for the measurement of the rotational speed of the axle 11. Referring now to FIG. 2 in order to describe its construction in greater detail, the tachometer generator 23 comprises essentially a rotor 24a formed integrally with the inner race 24 of the aforesaid bearing 16 and a stator 27 held in position by means of a housing 26 on the outer race 25 of the bearing 16. A permanent magnet 28 held by means of the aforesaid housing 26, stator 27, and bearing outer race 25 is provided with a coil 29.

Figure 3:
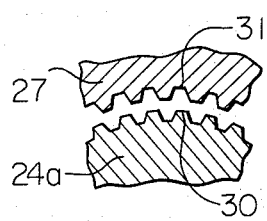
FIG. 3 is a sectional view taken along the plane of line 3 — 3 in FIG. 2.

A plurality of teeth 30 formed on the periphery of the rotor 24a are opposed to the same number of teeth 31 formed on the inner circumferential surface of the stator 27, with a slight spacing between the crests of these two sets of teeth 30 and 31 as illustrated fragmentarily in FIG. 3. A spacer 35 is disposed between the axle 11 and the rotor 24a.

The operation of the tachometer generator 23 of the above construction will now be described with relation to the rotation of the axle 11.

The rotor 24a formed integrally with the inner race 24 of the bearing 16 rotates in synchronism with the rotation of the axle 11. The magnitude of magnetic flux along a path 36 indicated by the dotted line in FIG. 2 fluctuates regularly as the crests and roots of the teeth 30 of the revolving rotor 24a alternately face the crests and roots of the teeth 31 of the stator 27 fixed to the outer race 25. As a result of electromagnetic induction, a voltage in accordance with such fluctuations in the magnitude of magnetic flux is produced in the coil 29 disposed in the magnetic path 36, and an alternating current signal is obtained from output terminals 37 and 38 connected to the coil 29. The frequency of this alternating current is in proportion to the rotational speed of the axle 11, becoming higher with increase in the speed of the axle since then a greater number of the teeth 30 of the rotor 24a pass the teeth 31 of the stator 27 in a unit length of time. Therefore, by measuring the aforementioned frequency of the alternating current signal by means of a suitable frequency meter or the like, the rotational speed of the axle 11 and therefore of the motor vehicle wheels can be indicated tachometrically.

The preferred form of the tachometer generator of the present invention shown and described in the foregoing disclosure is intended merely to illustrate and not to limit the invention. For example, the rotor teeth 30 may be formed on an extended spacer 35 of ferromagnetic material or its equivalent instead of the bearing inner race 24 as in the above described example, and may be opposed to the stator teeth 31 by reducing the axial length of the bearing inner race 24. This and other possible modifications conceivable by those skilled in the art are contemplated as being within the scope of the invention disclosed herein.

I claim:

1. A tachometer generator to generate a high-frequency signal to represent the rotational speed of a rotating axle, comprising, a stationary housing mounted concentrically of the rotating axle; a bearing assembly of ferromagnetic material including an inner race mounted on said axle for rotation therewith, a stationary outer race fixed to said housing, and a plurality of balls of ferromagnetic material interposed for rolling between said inner and outer races; an annular ferromagnetic rotor member formed on an axial extension of said inner race and toothed at its outer periphery; an annular stator member of ferromagnetic material disposed concentrically around the outer periphery of said rotor member and toothed at its inner periphery, the toothed peripheries of said rotor member and said stator member being opposed to each other with an air gap therebetween, said stator member and outer race being axially spaced to define an annular space; a magnet disposed in said angular space to be in contact with the stator member and the outer race for causing magnetic flux to flow in a magnetic path, said magnetic path being completed via said outer race, said plurality of balls, the inner race, the rotor and stator members and the air gap therebetween; and a winding means having output terminals and disposed to be inductively coupled with the magnetic flux in said magnetic path for generating an alternating current signal whose frequency is proportional to a rotational speed of the rotating axle, the tachometer generator being characterized in that said air gap between the stator member and the rotor member is the only non-ferromagnetic part of said magnetic path.

2. A tachometer generator as claimed in claim 1, wherein said axial extension of said inner race is an integral part of the inner race and said toothed rotor is thereby formed integrally with the inner race of the bearing assembly.

3. A tachometer generator as claimed in claim 1, wherein said axial extension of said inner race comprises a ferromagnetic annular spacer member, having teeth formed in its outer periphery and constituting said rotor member.

4. A tachometer generator as claimed in claim 1, further comprising first and second annular sealing members secured to said outer race on opposite sides of said plurality of balls.

* * * * *